United States Patent
Sofia et al.

(10) Patent No.: US 11,455,429 B2
(45) Date of Patent: Sep. 27, 2022

(54) CONTAINER-BASED CRYPTOGRAPHY HARDWARE SECURITY MODULE MANAGEMENT

(71) Applicant: International Business Machines Corporation, Armonk, NY (US)

(72) Inventors: Anthony Thomas Sofia, Hopewell-Junction, NY (US); James M. Caffrey, Woodstock, NY (US); Thomas Ginader, Wappingers Falls, NY (US); Elizabeth Santiago, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 47 days.

(21) Appl. No.: 17/110,722

(22) Filed: Dec. 3, 2020

(65) Prior Publication Data
US 2022/0180000 A1    Jun. 9, 2022

(51) Int. Cl.
*G06F 21/72*    (2013.01)

(52) U.S. Cl.
CPC .................. *G06F 21/72* (2013.01)

(58) Field of Classification Search
CPC .. G06F 21/602; G06F 21/72; G06F 2221/034; G06F 21/53; H04L 9/0897
USPC .......................................................... 713/189
See application file for complete search history.

(56) References Cited

U.S. PATENT DOCUMENTS

| | | | | |
|---|---|---|---|---|
| 10,129,232 B1* | 11/2018 | Phuong | .................. | G06F 11/362 |
| 10,210,333 B2* | 2/2019 | Smith, II | ................. | G06F 21/78 |
| 10,447,720 B1* | 10/2019 | Evans | ................. | H04L 63/0428 |
| 10,693,660 B2* | 6/2020 | Vilvovsky | ........... | G06F 21/6227 |
| 11,288,377 B1* | 3/2022 | Kopylov | ............. | G06F 9/45558 |
| 2014/0359186 A1* | 12/2014 | Helmschmidt | ......... | G06F 21/60 |
| | | | | 713/193 |

(Continued)

FOREIGN PATENT DOCUMENTS

| CN | 110325995 A | 10/2019 |
|---|---|---|
| EP | 3422234 B1 | 1/2019 |

OTHER PUBLICATIONS

International Search Report and Written Opinion for International Application No. PCT/CN2021/130927; Internationsl Filing Date: Nov. 16, 2021; dated Jan. 26, 2022; 10 pages.

(Continued)

*Primary Examiner* — Lizbeth Torres-Diaz
(74) *Attorney, Agent, or Firm* — Cantor Colburn LLP; Edward Wixted

(57) ABSTRACT

Techniques for container-based cryptography hardware security module (HSM) management in a computer system are described herein. An aspect includes providing a cryptography work daemon container in a computer system, wherein the cryptography work daemon container in the computer system has privileged access to a cryptography HSM of the computer system. Another aspect includes receiving, by the cryptography work daemon container, a request for a cryptography function of the cryptography HSM from an application container in the computer system. Another aspect includes causing, by the cryptography work daemon container, the cryptography HSM to perform the cryptography function based on receiving the request.

17 Claims, 7 Drawing Sheets

(56) References Cited

U.S. PATENT DOCUMENTS

| | | | |
|---|---|---|---|
| 2016/0028698 A1 | 1/2016 | Antipa et al. | |
| 2016/0219073 A1* | 7/2016 | Mathur | H04L 63/105 |
| 2017/0249472 A1* | 8/2017 | Levy | G06F 21/6245 |
| 2018/0152423 A1 | 5/2018 | Dayka et al. | |
| 2018/0309747 A1* | 10/2018 | Sweet | G06F 9/45558 |
| 2019/0342079 A1* | 11/2019 | Rudzitis | G06F 21/72 |
| 2020/0153623 A1* | 5/2020 | Asanghanwa | H04L 9/3213 |
| 2020/0233964 A1* | 7/2020 | Hocker | G06F 21/64 |
| 2020/0250319 A1* | 8/2020 | Bacher | G06F 16/116 |
| 2020/0366653 A1* | 11/2020 | Caceres | H04L 63/0853 |
| 2022/0180000 A1* | 6/2022 | Sofia | G06F 21/53 |

OTHER PUBLICATIONS

IBM; "What is a Crypto Express EP11 coprocessor?", Published Oct. 28, 2020, 106 pages, http://public.dhe.ibm.com/software/dw/linux390/docu/l3bxce02.pdf.

* cited by examiner

CONTAINER-BASED CRYPTOGRAPHY HARDWARE SECURITY MODULE MANAGEMENT

BACKGROUND

The present invention generally relates to computer systems, and more specifically, to container-based cryptography hardware security module (HSM) management in a computer system.

Encryption is a process of transforming information so that the information is unintelligible to anyone but an intended recipient. Decryption is the process of transforming encrypted information so that it is intelligible again. A cryptographic algorithm, also called a cipher, is a mathematical function used for encryption or decryption. In most cases, two related functions are employed, one for encryption and the other for decryption. Many individuals and companies use encryption to protect sensitive information of all types.

With most modern cryptography, the ability to keep encrypted information secret is based not on the cryptographic algorithm, which is widely known, but on a number called a key that must be used with the algorithm to produce an encrypted result or to decrypt previously encrypted information. Decryption with the correct key is simple. Decryption without the correct key should be very difficult, and at best impossible for all practical purposes. Encryption can be used for many purposes. For example, encryption can be used to exchange sensitive data over an untrusted channel (e.g., the internet) in a secure fashion, or to protect access to sensitive data that is stored on some type of storage media or in a computer memory.

SUMMARY

Embodiments of the present invention are directed to container-based cryptography hardware security module (HSM) management in a computer system. A non-limiting example computer-implemented method includes providing a cryptography work daemon container in a computer system, wherein the cryptography work daemon container in the computer system has privileged access to a cryptography HSM of the computer system. The method also includes receiving, by the cryptography work daemon container, a request for a cryptography function of the cryptography HSM from an application container in the computer system. The method also includes causing, by the cryptography work daemon container, the cryptography HSM to perform the cryptography function based on receiving the request Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
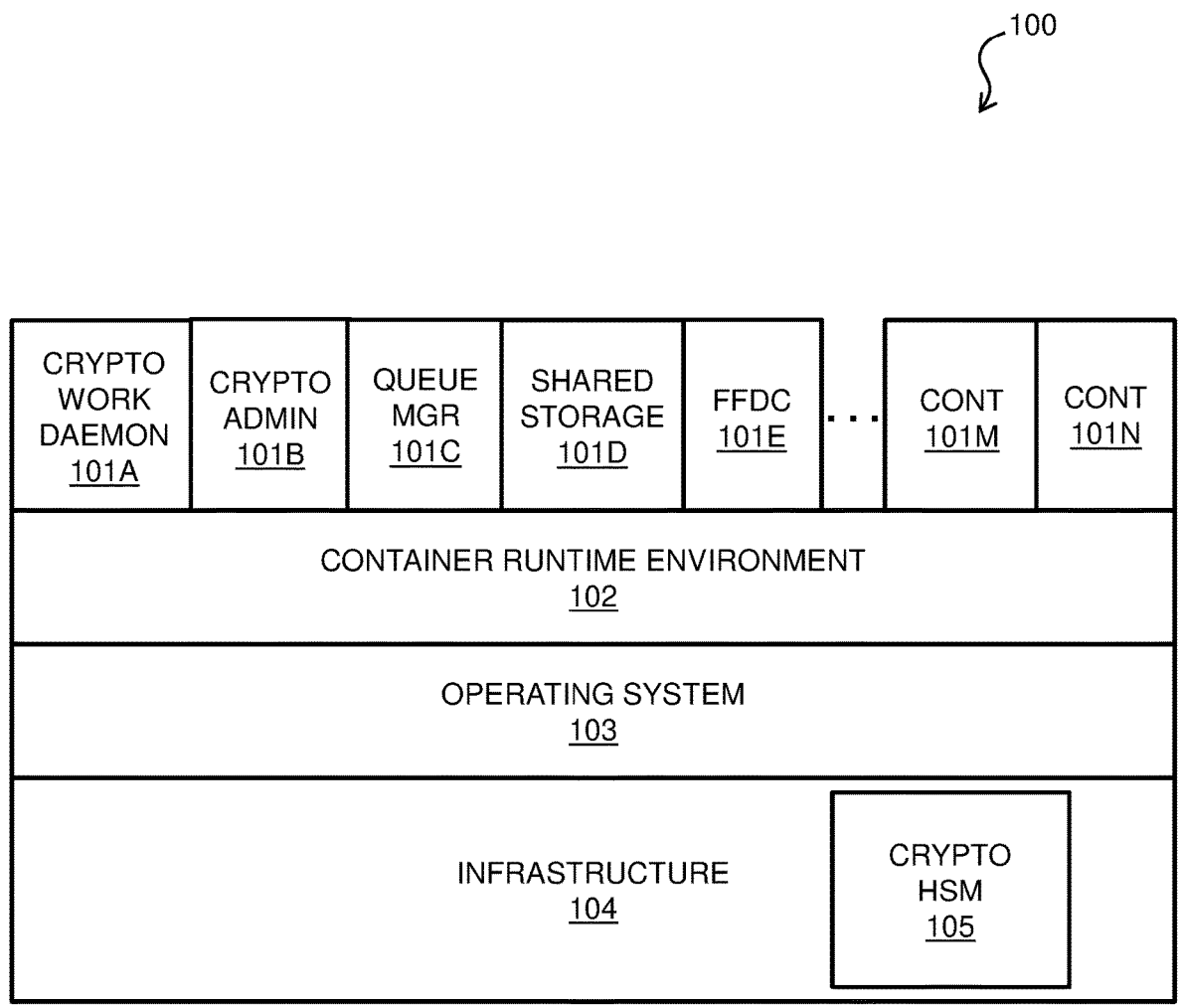
FIG. 1 is a block diagram of components of a system for container-based cryptography hardware security module (HSM) management in accordance with one or more embodiments of the present invention.

One or more embodiments of the present invention provide container-based cryptography hardware security module (HSM) management. Hardware cryptographic functions (e.g., encryption and decryption of data) in computer system can be performed by a dedicated hardware module referred to as a cryptography HSM (e.g., a CryptoExpress® card). The services in such a computer system can be provisioned in a number of containers; each container can host an application that provides a particular set of functions. In a system where hardware-based cryptography is used for data encryption and decryption across a set of containers, access to the cryptography HSM may need to be managed. For example, only a single container may be permitted to access the cryptography HSM at a given time. Therefore, a cryptography work daemon container can be provided that has privileged access to the cryptography HSM. The cryptography work daemon container can control access to the cryptography HSM by other containers in the system, such that the other containers in the system can access the cryptography HSM via requests to the cryptography work daemon container. For example, an application container can request that the cryptography work daemon container perform a decryption of data on application startup.

The cryptography work daemon container can provide any appropriate functions, including but not limited to creation of enterprise public #11 (EP11) keys, storage of created keys in public key cryptography standards #11 (PKCS11) keystores, and using the stored keys to encrypt and decrypt data. The cryptography work daemon container can re-encrypt any stored keys when a master key roll, or update, happens in the cryptography HSM. When master key roll is performed, a migrate tool can be run to migrate existing token objects to be re-encrypted under the new master key. The migrate tool can be run by the cryptography work daemon container, as privileged access to the cryptography HSM may be required to run the migrate tool. However, as only privileged users should be allowed to run the migrate tool, a separate cryptography administrator container can be provided in order to separate application administrator roles from security administrator roles for the purposes of performing a master key roll in the cryptography HSM. The security administrator role may have no authority over the application, and the application administrator role may have no authority over the cryptography HSM.

Diagnostic tools can be run by the cryptography work daemon container in order to obtain diagnostic information from the cryptography HSM. Diagnostic information that is output by the diagnostic tools can be stored and shared between containers via a shared storage container. Once the diagnostic information is in shared storage, the diagnostic information will persist and can be accessed by other containers as needed. For example, a first failure data capture (FFDC) container can monitor the diagnostic information that is in shared storage, and can dump the diagnostic information upon user request. The FFDC container does not need physical access to the cryptography HSM in order to access the diagnostic information in the shared storage. A support team can validate that the correct keys are being used based on the diagnostic information without direct access to the cryptography work daemon container or the cryptography HSM, and key material may not be exposed by the validation.

Turning now to FIG. 1, system 100 that includes container-based cryptography HSM management is generally shown in accordance with one or more embodiments of the present invention. Some embodiments of system 100 can be implemented by a cloud computing environment as is discussed below with respect to FIG. 5 and FIG. 6. System 100 includes a plurality of containers 101A-N. The containers 101A-N can each host one or more applications, and can each include a respective set of binaries and libraries that are run in the container to support any functions that are provided by the container's respective application(s). The containers 101A-N are managed by container runtime environment 102, which runs on operating system 103. Operating system 103, which can be any appropriate operating system, is hosted by hardware infrastructure 104. Infrastructure 104 can correspond to any appropriate computer system, including but not limited to computer system 700 of FIG. 7. Infrastructure 104 includes a cryptography HSM 105. Cryptography HSM 105 can include a CryptoExpress® card in some embodiments of the invention. The container runtime environment 102 can include any appropriate container runtime environment, including but not limited to a hypervisor such as Docker® in some embodiments of the invention, and can include a container management system such as Kubernetes® in some embodiments of the invention. The locations of the containers 101A-N can be dynamic, such that the container runtime environment 102 tracks the location and network addressing information of each container during operation of system 100.

As shown in FIG. 1, containers 101A-N include cryptography work daemon container 101A, a cryptography administrator container 101B, a queue manager container 101C, a shared storage container 101D, and an FFDC container 101E. Cryptography work daemon container 101A has privileged access to the cryptography HSM 105, and can regulate access to cryptography HSM 105 for the other containers 101B-N in system 100 according to method 200 of FIG. 2, which is discussed below. Management of cryptography-related tasks can be performed in system 100 according to method 300 of FIG. 3, and method 400 of FIG. 4, which are discussed below. For example, cryptography administrator container 101B can implement functions that are required to update the master key in the cryptography HSM 105 according to method 300 of FIG. 3. The cryptography work daemon container 101A can run a migrate tool to re-encrypt any stored keys when a master key roll, or update, happens in the cryptography HSM 105. The migrate tool can be run by the cryptography work daemon container 101A, as privileged access to the cryptography HSM may be required to run the migrate tool. However, as only privileged users should be allowed to run the migrate tool, the separate cryptography administrator container 101B can be provided to separate application administrator roles from security administrator roles for the purposes of performing a master key roll in the cryptography HSM 105. The cryptography administrator container 101B can cause the cryptography work daemon container 101A to run the migrate tool based on input from a security administrator. The security administrator role may have no authority over the cryptography work daemon application, and the application administrator role may have no authority over the cryptography HSM 105. Further, diagnostic information regarding cryptography HSM 105 can be gathered by cryptography work daemon container 101A, and stored in shared storage by shared storage container 101D, according to method 400 of FIG. 4. The diagnostic information in shared storage can be accessed by other containers of containers 101B-N in system 100, such as FFDC container 101E.

It is to be understood that the block diagram of FIG. 1 is not intended to indicate that the system 100 is to include all of the components shown in FIG. 1. Rather, the system 100 can include any appropriate fewer or additional components not illustrated in FIG. 1 (e.g., additional memory components, embedded controllers, functional blocks, connections between functional blocks, modules, inputs, outputs, containers, applications, etc.). Further, the embodiments described herein with respect to system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
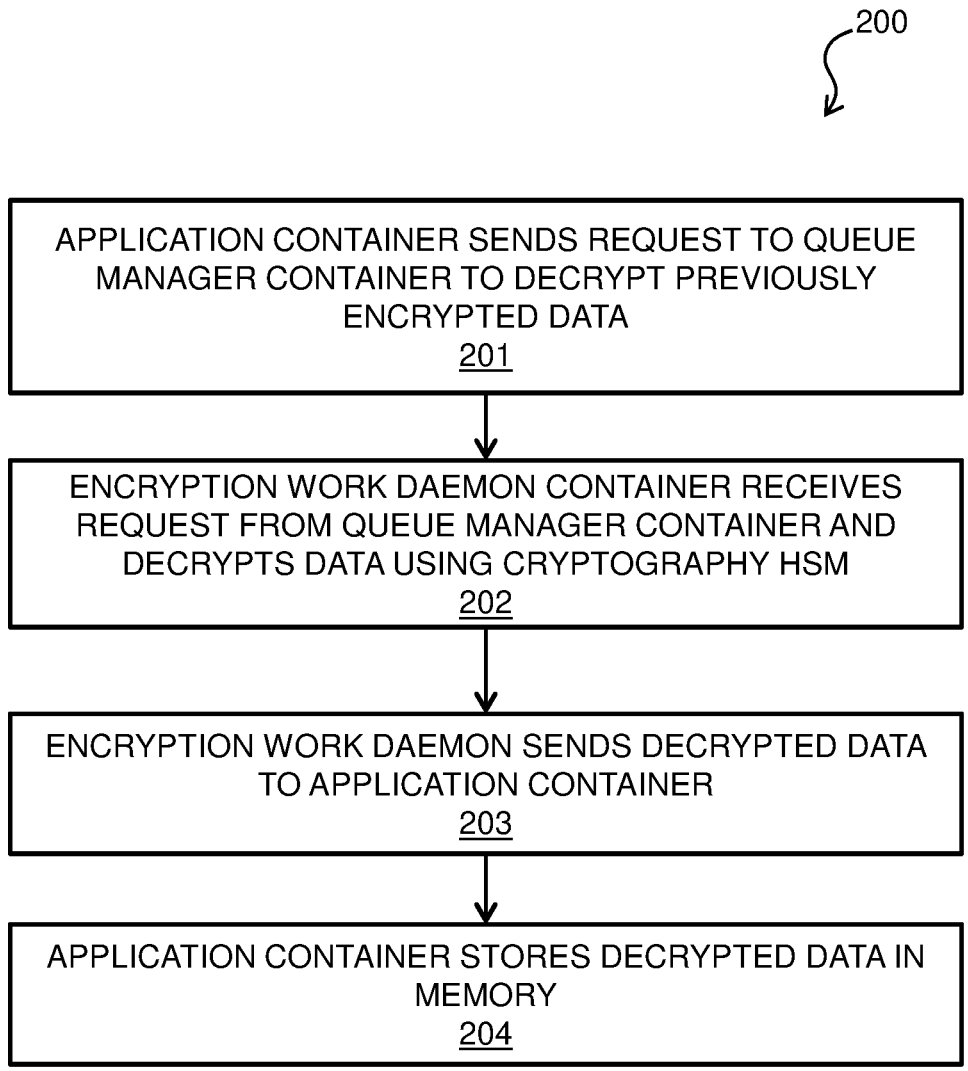
FIG. 2 is a flow diagram of a process for container-based cryptography HSM management in accordance with one or more embodiments of the present invention.

FIG. 2 shows a process flow diagram of a method 200 for container-based cryptography HSM management in accordance with one or more embodiments of the present invention. Method 200 of FIG. 2 can be implemented in conjunction with, and is discussed with reference to, embodiments of system 100 of FIG. 1. In block 201, an application container in system 100, such as application container 101N, sends a request to the queue manager container 101C to decrypt previously encrypted data. The encrypted data can belong to application container 101N, and can be stored in a memory in infrastructure 104. In some embodiments of the invention, the request of block 201 can be sent at startup of the application in application container 101N. The request of block 201 can be sent as a JAVA® messenger service (JMS) message in some embodiments of the invention. In block 202, the cryptography work daemon container 101A receives the request from the queue manager container 101C and decrypts the encrypted data using the cryptography HSM 105. In block 203, the cryptography work daemon container 101A sends the decrypted data to the requesting application container 101N. In some embodiments of block 203, the decrypted data can be sent as a JMS message. In block 204, the application container 101N stores the decrypted data in memory in infrastructure 104. In some embodiments of block 204, application container 101N can store the decrypted data in temporary file storage (tmpfs) in virtual memory in infrastructure 104. The application container 101N can then perform any appropriate operations using the decrypted data.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
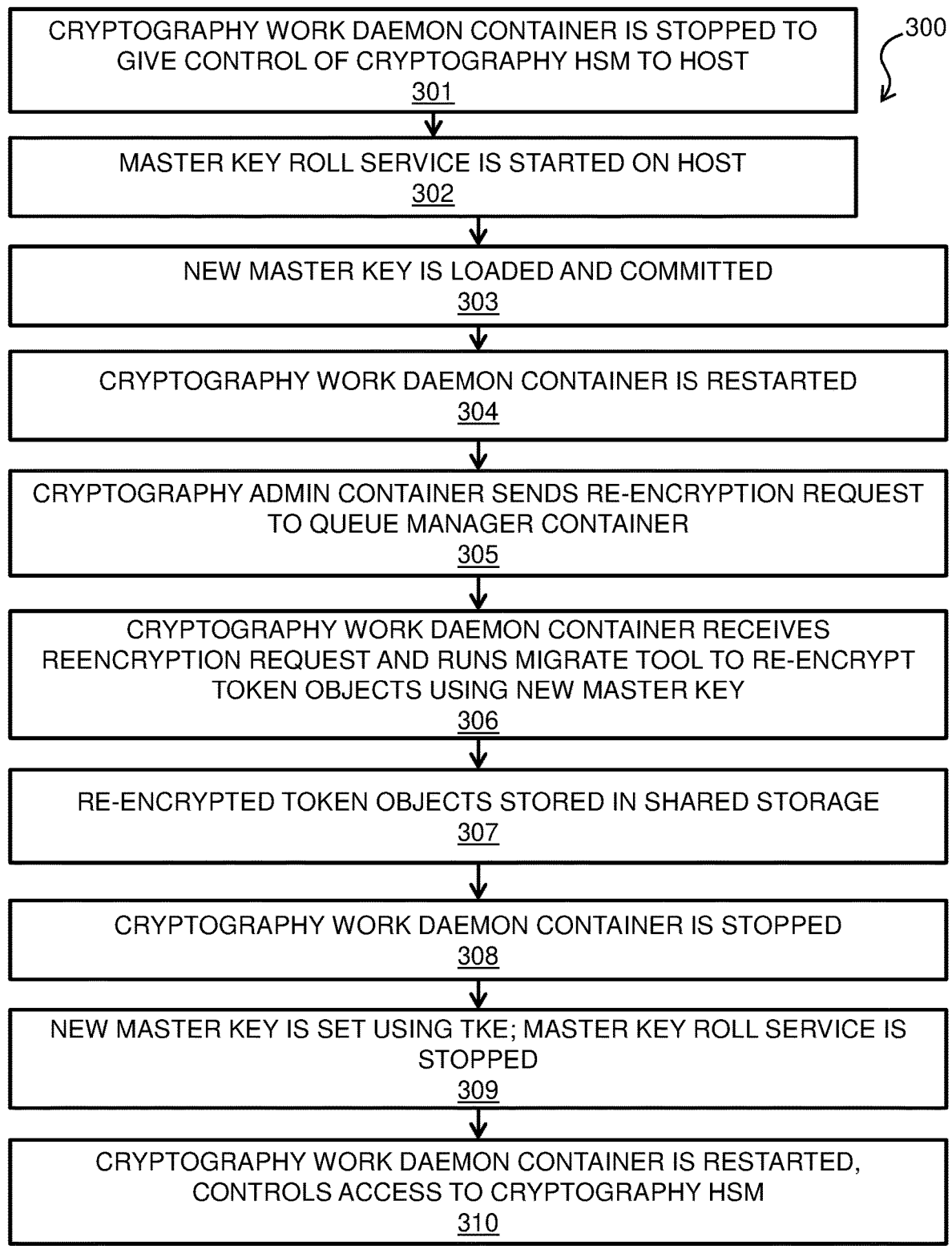
FIG. 3 is a flow diagram of a process for loading a new master key for container-based cryptography HSM management in accordance with one or more embodiments of the present invention.

FIG. 3 shows a process flow diagram of a method 300 for loading a new master key for container-based cryptography HSM management in accordance with one or more embodiments of the present invention. Method 300 of FIG. 3 can be implemented in conjunction with, and is discussed with reference to, embodiments of system 100 of FIG. 1. In block 301, the cryptography work daemon container 101A is stopped and deleted from system 100 to give control of the cryptography HSM 105 to the host machine that includes operating system 103 and infrastructure 104. In block 302, a master key roll service is started on the host. The master key roll service can include an enterprise public key cryptography standards #11 trusted key entry daemon (ep11TKEd) in some embodiments of the invention. In block 303, a new master key is loaded and committed in cryptography HSM 105 using the master key roll service. The new master key can be loaded and committed in cryptography HSM 105 via a trusted key entry (TKE) in block 303 in some embodiments of the invention.

In block 304, the cryptography work daemon container 101A is recreated and restarted in system 100. In block 305, the cryptography administrator container 101B sends a re-encryption request to queue manager container 101C. The request of block 305 can be initiated by a security administrator of system 100, and can be a JMS message in some embodiments of the invention. In block 306, the cryptography work daemon container 101A receives the request of block 305 from the queue manager container 101C, and re-encrypts token objects using the new master key that was loaded and committed in block 303 by running a migrate tool. In block 307, the re-encrypted token objects are stored in shared storage (e.g., network file system) in system 100 using shared storage container 101D.

In block 308, the cryptography work daemon container 101A is stopped and deleted from system 100. In block 309, the new master key is set in the cryptography HSM 105 using the TKE, and the master key roll service that was started in system 100 in block 302 of method 300 is stopped. In block 310, the cryptography work daemon container 101A is recreated and restarted in system 100, such that access to the cryptography HSM 105 for encryption and decryption functions, based on the new master key, by the other containers 101B-N is performed via the cryptography work daemon container 101A during operation of the system 100.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
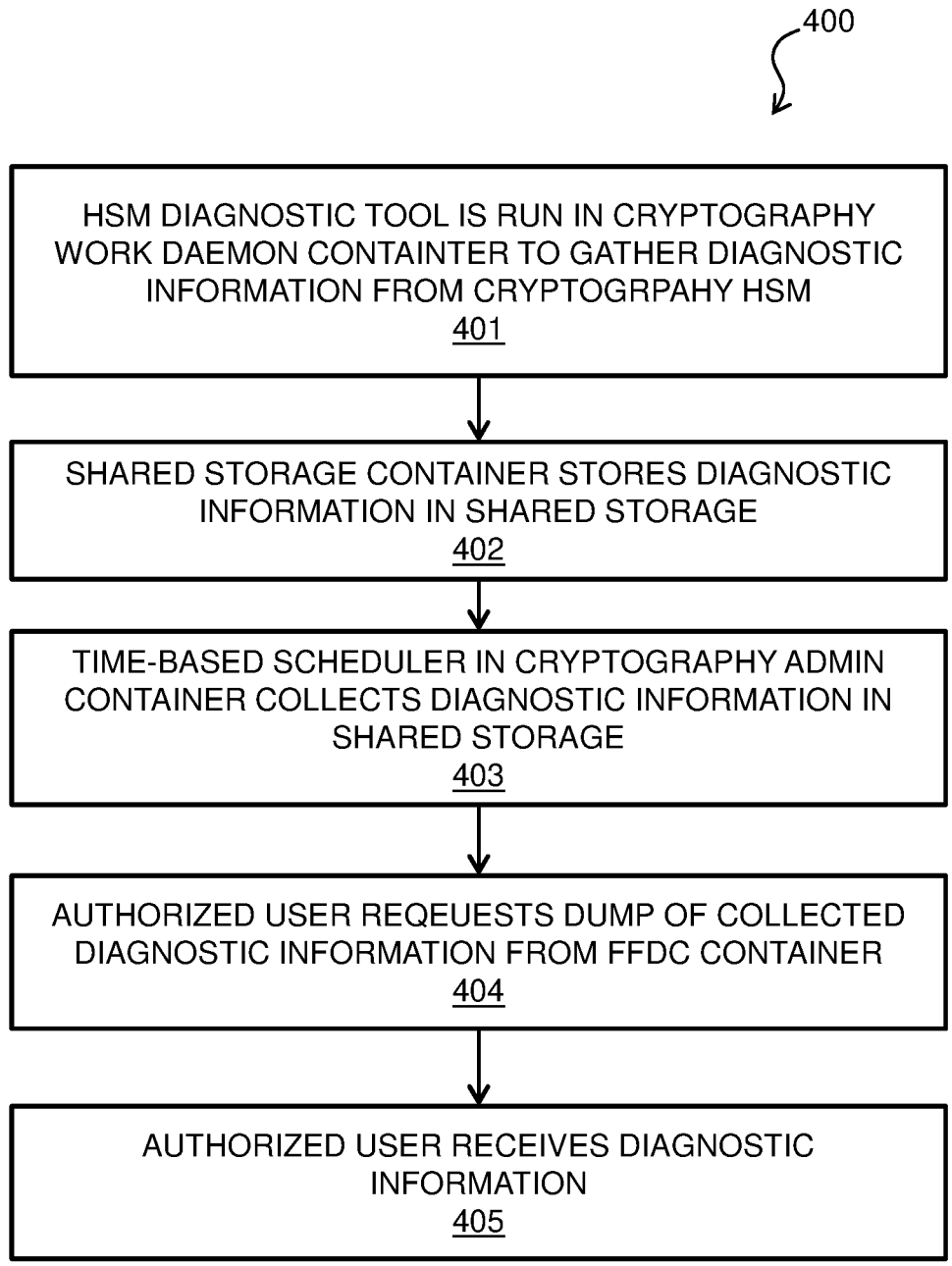
FIG. 4 is a flow diagram of a process for container-based cryptography HSM management in accordance with one or more embodiments of the present invention.

FIG. 4 shows a process flow diagram of a method 400 for container-based cryptography HSM management in accordance with one or more embodiments of the present invention. Method 400 of FIG. 4 can be implemented in conjunction with, and is discussed with reference to, embodiments of system 100 of FIG. 1. In block 401, a cryptography HSM diagnostic tool is run in cryptography work daemon container 101A. The HSM diagnostic tool can gather any appropriate diagnostic information from cryptography HSM 105, including but not limited to basic card information, and/or a history of master keys that have been used by the cryptography HSM 105. Card information that can be gathered in block 401 can include the online status of the card, the mode of the card, and hardware cryptographic counts. The history of master keys that can be gathered in block 401 can include the current master key pattern, any previous master key patterns, and a timestamp of when the mater keys were changed in the cryptography HSM 105. In some embodiments of block 401, the diagnostic information can be gathered by using an application programming interface (API) that can interact with the cryptography work daemon container 101A. The API can be called by an authorized user in some embodiments of the invention, or the diagnostic tool can be run periodically using a time-based scheduler tool such as cron. In block 402, the shared storage container 101D stores the diagnostic information that was output by the HSM diagnostic tool in shared storage (e.g., network file system) in system 100.

In block 403, a time-based scheduler in the cryptography administrator container 101B collects the diagnostic information that is stored in the shared storage, along with any other useful diagnostic information. In block 404, an authorized user requests a dump of collected diagnostic information. The authorized user can request the dump of that diagnostic information by interacting with FFDC container 101E. The authorized user may be part of a support team that administers system 100. In block 405, the authorized user receives the dump of the diagnostic information from, for example, FFDC container 101E. The diagnostic information can allow the authorized user to diagnose various issues in cryptography HSM 105, including but not limited to whether the master key is incorrect, or whether the card is offline, without needing to directly access cryptography HSM 105.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
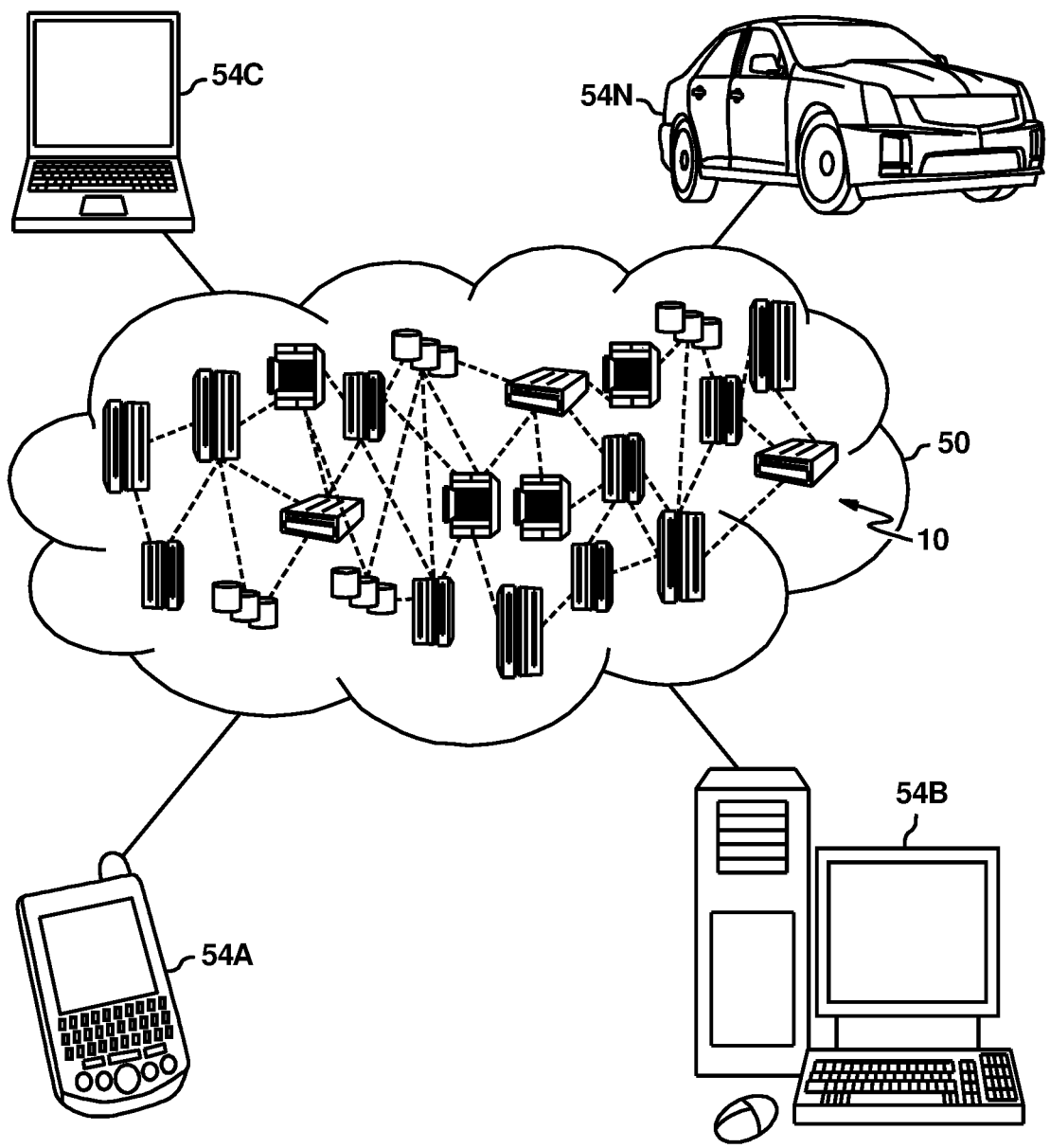
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
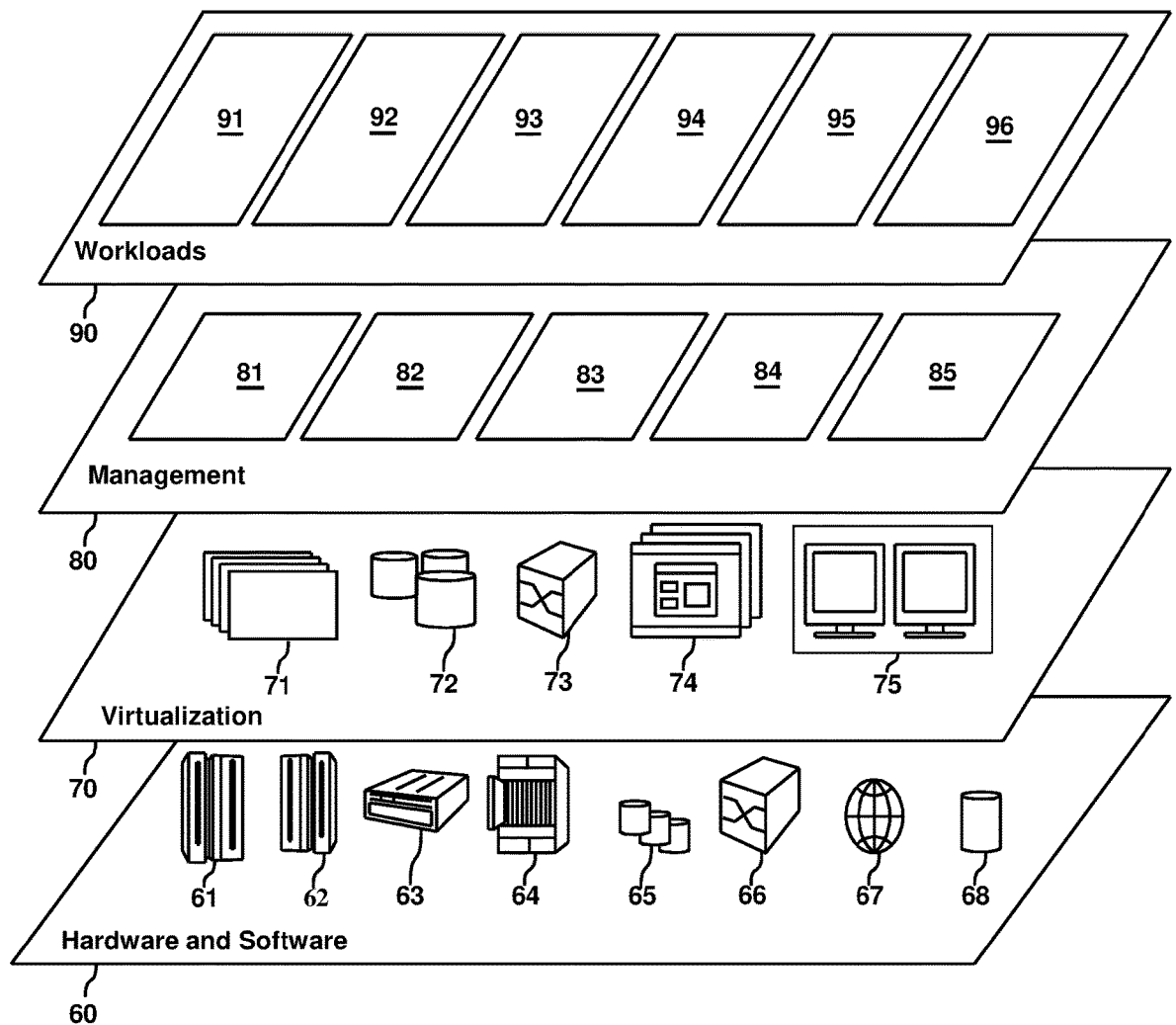
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described herein. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cryptography HSM management 96. Hardware 60 can include a cryptography HSM in embodiments of the invention, and cryptography HSM management 96 can manage access to the cryptography HSM by implementing any functions discussed above with respect to FIGS. 1-4.

Figure 7:
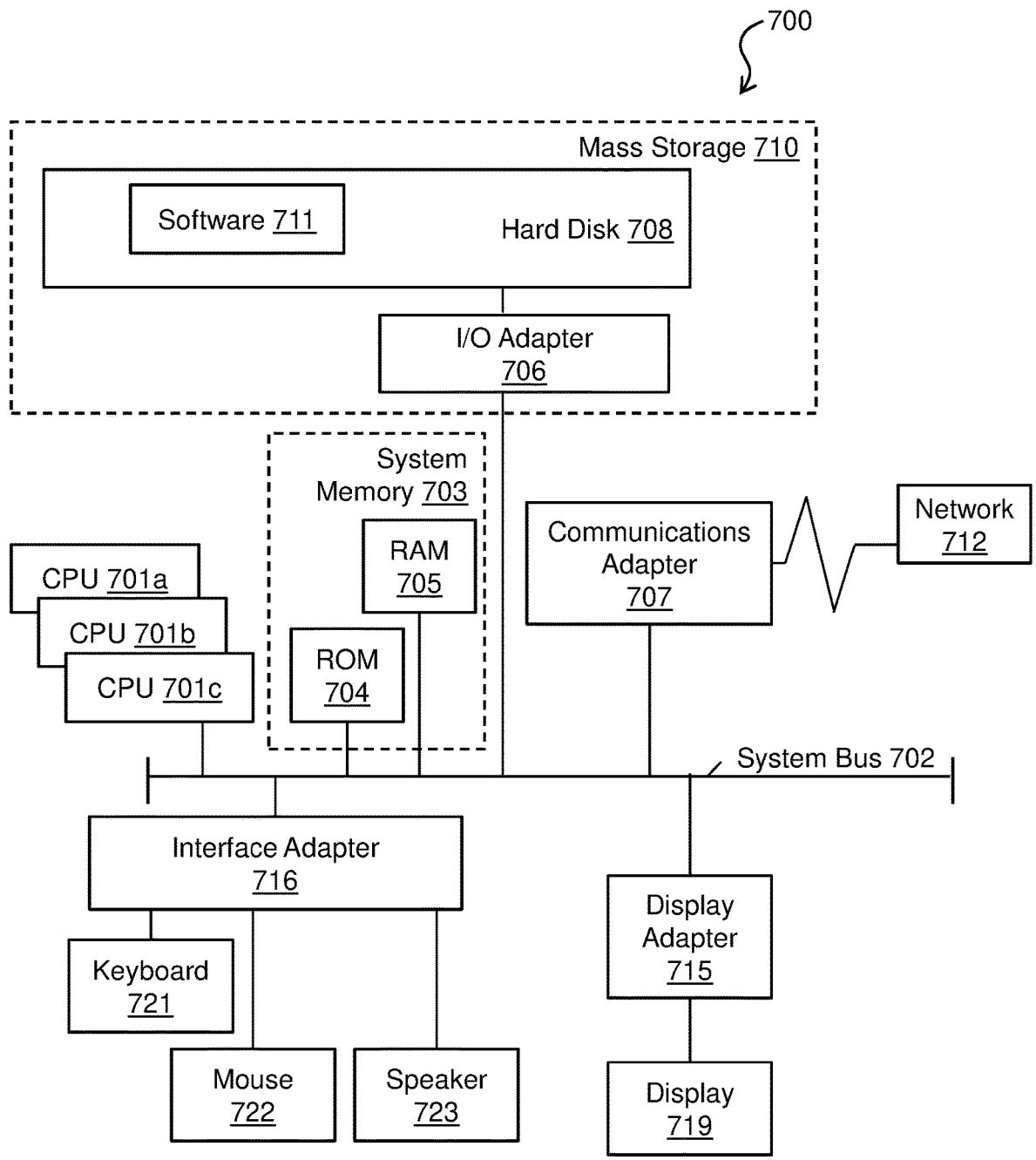
FIG. 7 is a block diagram of an example computer system for use in conjunction with one or more embodiments of container-based cryptography HSM management.

Turning now to FIG. 7, a computer system 700 is generally shown in accordance with an embodiment. The computer system 700 can be an electronic, computer framework comprising and/or employing any number and combination of computing devices and networks utilizing various communication technologies, as described herein. The computer system 700 can be easily scalable, extensible, and modular, with the ability to change to different services or reconfigure some features independently of others. The computer system 700 may be, for example, a server, desktop computer, laptop computer, tablet computer, or smartphone. In some examples, computer system 700 may be a cloud computing node. Computer system 700 may be described in the general context of computer system executable instructions, such as program modules, being executed by a computer system. Generally, program modules may include routines, programs, objects, components, logic, data structures, and so on that perform particular tasks or implement particular abstract data types. Computer system 700 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system 700 has one or more central processing units (CPU(s)) 701*a*, 701*b*, 701*c*, etc. (collectively or generically referred to as processor(s) 701). The processors 701 can be a single-core processor, multi-core processor, computing cluster, or any number of other configurations. The processors 701, also referred to as processing circuits, are coupled via a system bus 702 to a system memory 703 and various other components. The system memory 703 can include a read only memory (ROM) 704 and a random access memory (RAM) 705. The ROM 704 is coupled to the system bus 702 and may include a basic input/output system (BIOS), which controls certain basic functions of the computer system 700. The RAM is read-write memory coupled to the system bus 702 for use by the processors 701. The system memory 703 provides temporary memory space for operations of said instructions during operation. The system memory 703 can include random access memory (RAM), read only memory, flash memory, or any other suitable memory systems.

The computer system 700 comprises an input/output (I/O) adapter 706 and a communications adapter 707 coupled to the system bus 702. The I/O adapter 706 may be a small computer system interface (SCSI) adapter that communicates with a hard disk 708 and/or any other similar component. The I/O adapter 706 and the hard disk 708 are collectively referred to herein as a mass storage 710.

Software 711 for execution on the computer system 700 may be stored in the mass storage 710. The mass storage 710 is an example of a tangible storage medium readable by the processors 701, where the software 711 is stored as instructions for execution by the processors 701 to cause the computer system 700 to operate, such as is described herein with respect to the various Figures. Examples of computer program product and the execution of such instruction is discussed herein in more detail. The communications adapter 707 interconnects the system bus 702 with a network 712, which may be an outside network, enabling the computer system 700 to communicate with other such systems. In one embodiment, a portion of the system memory 703 and the mass storage 710 collectively store an operating system, which may be any appropriate operating system, such as the z/OS or AIX operating system from IBM Corporation, to coordinate the functions of the various components shown in FIG. 7.

Additional input/output devices are shown as connected to the system bus 702 via a display adapter 715 and an interface adapter 716 and. In one embodiment, the adapters 706, 707, 715, and 716 may be connected to one or more I/O buses that are connected to the system bus 702 via an intermediate bus bridge (not shown). A display 719 (e.g., a screen or a display monitor) is connected to the system bus 702 by a display adapter 715, which may include a graphics controller to improve the performance of graphics intensive applications and a video controller. A keyboard 721, a mouse 722, a speaker 723, etc. can be interconnected to the system bus 702 via the interface adapter 716, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 7, the computer system 700 includes processing capability in the form of the processors 701, and, storage capability including the system memory 703 and the mass storage 710, input means such as the keyboard 721 and the mouse 722, and output capability including the speaker 723 and the display 719.

In some embodiments, the communications adapter 707 can transmit data using any suitable interface or protocol, such as the internet small computer system interface, among others. The network 712 may be a cellular network, a radio network, a wide area network (WAN), a local area network (LAN), or the Internet, among others. An external computing device may connect to the computer system 700 through the network 712. In some examples, an external computing device may be an external webserver or a cloud computing node.

It is to be understood that the block diagram of FIG. 7 is not intended to indicate that the computer system 700 is to include all of the components shown in FIG. 7. Rather, the computer system 700 can include any appropriate fewer or additional components not illustrated in FIG. 7 (e.g., additional memory components, embedded controllers, modules, additional network interfaces, etc.). Further, the embodiments described herein with respect to computer system 700 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
providing, by a processor, a cryptography work daemon container in a computer system, wherein the cryptography work daemon container in the computer system has privileged access to a cryptography hardware security module (HSM) of the computer system;
receiving, by the cryptography work daemon container, a request for a cryptography function of the cryptography HSM from an application container in the computer system;
causing, by the cryptography work daemon container, the cryptography HSM to perform the cryptography function based on receiving the request;
running, by the cryptography work daemon container, an HSM diagnostic tool that gathers diagnostic information from the cryptography HSM;
storing the diagnostic information in shared storage in the computer system;

collecting, by a cryptography administrator container, the diagnostic information from the shared storage; and providing the collected diagnostic information to a user.

2. The method of claim 1, wherein the request comprises a decryption request;

wherein causing the cryptography HSM to perform the cryptography function comprises causing the cryptography HSM to decrypt data that belongs to the application container; and wherein the method further comprises providing the decrypted data from the cryptography work daemon container to the application container.

3. The method of claim 2, wherein the application container sends the request based on a startup of the application container, and wherein the application container performs operations using the decrypted data.

4. The method of claim 1, further comprising performing a master key roll in the cryptography HSM, wherein performing the master key roll comprises:

based on a new master key being committed:

sending from a cryptography administrator container to the cryptography work daemon container a re-encryption request;

based on receiving the re-encryption request, running a migrate tool by the cryptography work daemon container, wherein the migrate tool re-encrypts a token object using the new master key; and storing the re-encrypted token object in shared storage in the computer system.

5. The method of claim 4, wherein the re-encryption request is sent by a security administrator of the computer system.

6. The method of claim 1, wherein the collected diagnostic information is provided to the user based on receiving a dump request from the user by a first failure data capture (FFDC) container.

7. A system comprising:

a memory having computer readable instructions; and one or more processors for executing the computer readable instructions, the computer readable instructions controlling the one or more processors to perform operations comprising:

providing a cryptography work daemon container in a computer system, wherein the cryptography work daemon container in the computer system has privileged access to a cryptography hardware security module (HSM) of the computer system;

receiving, by the cryptography work daemon container, a request for a cryptography function of the cryptography HSM from an application container in the computer system;

causing, by the cryptography work daemon container, the cryptography HSM to perform the cryptography function based on receiving the request;

running, by the cryptography work daemon container, an HSM diagnostic tool that gathers diagnostic information from the cryptography HSM;

storing the diagnostic information in shared storage in the computer system;

collecting, by a cryptography administrator container, the diagnostic information from the shared storage; and providing the collected diagnostic information to a user.

8. The system of claim 7, wherein the request comprises a decryption request;

wherein causing the cryptography HSM to perform the cryptography function comprises causing the cryptography HSM to decrypt data that belongs to the application container; and wherein the operations further comprise providing the decrypted data from the cryptography work daemon container to the application container.

9. The system of claim 8, wherein the application container sends the request based on a startup of the application container, and wherein the application container performs operations using the decrypted data.

10. The system of claim 7, the operations further comprising performing a master key roll in the cryptography HSM, wherein performing the master key roll comprises:

based on a new master key being committed:

sending from a cryptography administrator container to the cryptography work daemon container a re-encryption request;

based on receiving the re-encryption request, running a migrate tool by the cryptography work daemon container, wherein the migrate tool re-encrypts a token object using the new master key; and storing the re-encrypted token object in shared storage in the computer system.

11. The system of claim 10, wherein the re-encryption request is sent by a security administrator of the computer system.

12. The system of claim 7, wherein the collected diagnostic information is provided to the user based on receiving a dump request from the user by a first failure data capture (FFDC) container.

13. A non-transitory computer readable storage medium executable by one or more processors to cause the one or more processors to perform operations comprising:

providing a cryptography work daemon container in a computer system, wherein the cryptography work daemon container in the computer system has privileged access to a cryptography hardware security module (HSM) of the computer system;

receiving, by the cryptography work daemon container, a request for a cryptography function of the cryptography HSM from an application container in the computer system;

causing, by the cryptography work daemon container, the cryptography HSM to perform the cryptography function based on receiving the request;

running, by the cryptography work daemon container, an HSM diagnostic tool that gathers diagnostic information from the cryptography HSM;

storing the diagnostic information in shared storage in the computer system;

collecting, by a cryptography administrator container, the diagnostic information from the shared storage; and providing the collected diagnostic information to a user.

14. The non-transitory computer readable storage medium of claim 13, wherein the request comprises a decryption request;

wherein causing the cryptography HSM to perform the cryptography function comprises causing the cryptography HSM to decrypt data that belongs to the application container; and wherein the operations further comprise providing the decrypted data from the cryptography work daemon container to the application container.

15. The non-transitory computer readable storage medium of claim 14, wherein the application container sends the request based on a startup of the application container, and wherein the application container performs operations using the decrypted data.

16. The non-transitory computer readable storage medium of claim 13, wherein the operations further comprise performing a master key roll in the cryptography HSM, wherein performing the master key roll comprises:
   based on a new master key being committed:
      sending from a cryptography administrator container to the cryptography work daemon container a re-encryption request;
      based on receiving the re-encryption request, running a migrate tool by the cryptography work daemon container, wherein the migrate tool re-encrypts a token object using the new master key; and
      storing the re-encrypted token object in shared storage in the computer system.

17. The non-transitory computer readable storage medium of claim 16, wherein the re-encryption request is sent by a security administrator of the computer system.

\* \* \* \* \*